Sept. 11, 1956
R. A. COLBY
2,762,961
SHAFT POSITIONING MECHANISM
Filed Oct. 4, 1952
2 Sheets-Sheet 1
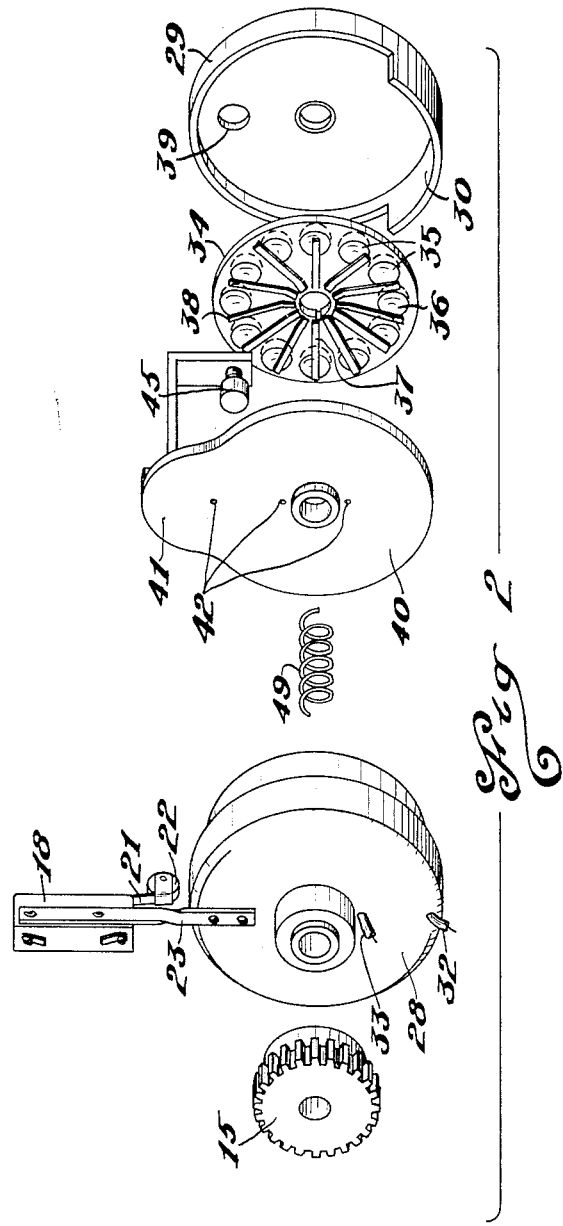
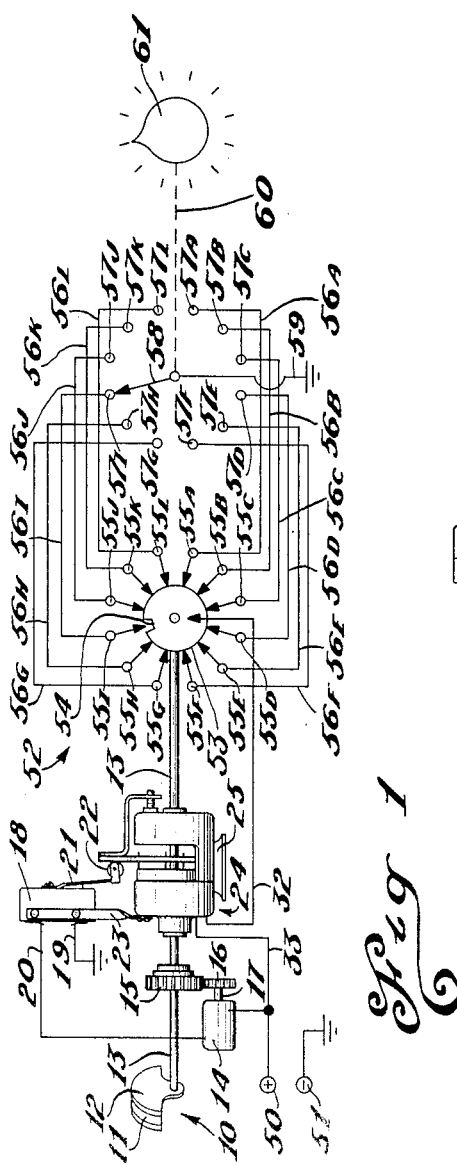
INVENTOR.
ROBERT A. COLBY
BY
ATTORNEY Sept. 11, 1956          R. A. COLBY          2,762,961

SHAFT POSITIONING MECHANISM

Filed Oct. 4, 1952          2 Sheets-Sheet 2

INVENTOR.
ROBERT A. COLBY
BY
*Marvin Moody*

ATTORNEY

United States Patent Office 2,762,961
Patented Sept. 11, 1956

2,762,961

SHAFT POSITIONING MECHANISM

Robert A. Colby, Marion, Iowa, assignor to Collins Radio Company, Cedar Rapids, Iowa, a corporation of Iowa Application October 4, 1952, Serial No. 313,138

6 Claims. (Cl. 318—467)

This invention relates to shaft positioning mechanisms.

It is oftentimes desirable to control a shaft to any one of a plurality of remembered positions such that it may be returned to the distinct positions at any subsequent time. For example, see the co-pending application of Horst M. Schweighofer, "Shaft Positioning Device," Serial No. 271,020, filed February 11, 1952, which relates to shaft positioning mechanisms, and the patent to May et al., "Shaft Positioning Control System," No. 2,476,673, which describes a wire saving scheme and shaft controlling device. It is an object of the present invention to provide a positive acting shaft positioning system wherein the remembered positions may be repeatedly obtained.

Another object of this invention is to provide a shaft positioning mechanism which is relatively simple and inexpensive to construct.

A feature of this invention is found in the provision for a shaft positioning mechanism which utilizes a magnetic clutch to selectively seat or unseat one of a plurality of balls receivable in a detent end plate.

Figure 4:
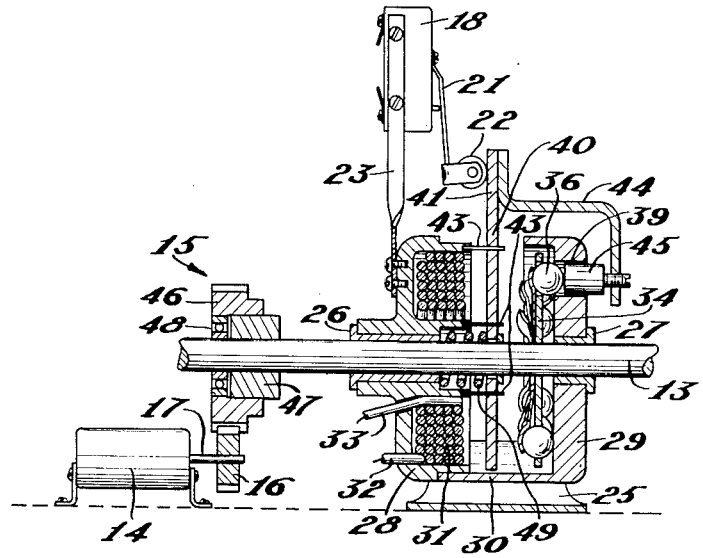
Figure 3:
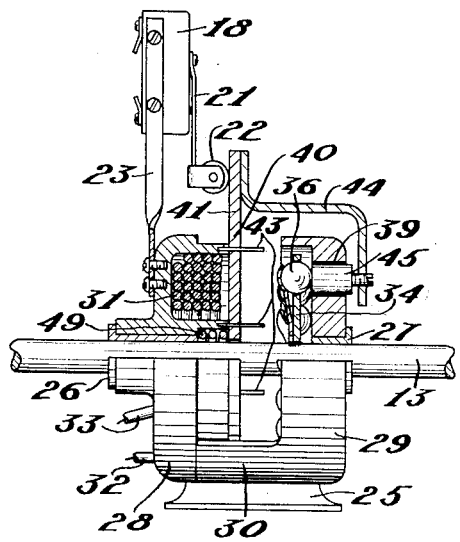

Further objects, features and advantages of this invention will become apparent from the following description and claims when read in view of the drawings, in which:

Figure 1 is a view of the positioning mechanism of this invention shown with a suitable control circuit and driving means, Figure 2 is an exploded view of the shaft positioning mechanism of the invention, Figure 3 is a half section of the shaft positioning mechanism of the invention illustrating the clutch in an energized position, and Figure 4 is a sectional view of the invention disclosing the clutch in the de-energized position.

Figure 1 illustrates a controlled apparatus designated generally as 10 in which is shown for purposes of illustration as a condenser having a stator plate 11 and a rotor plate 12 which is mounted on a control shaft 13. The problem illustrated is that of positioning the rotor 12 relative to the stator 11 to obtain any one of a plurality of settings.

The control shaft 13 is coupled to a motor 14 through a clutch gear 15 and a drive gear 16 mounted on the output shaft 17 of the motor. A motor control switch 18 has one side 19 connected to ground and the other side 20 connected to the motor. The switch 18 has an actuating lever 21 with a roller 22 mounted to its free end. The switch 18 is supported by a suitable mechanical support 23 that is connected to a frame 24. The frame 24 is connected to a stationary member by the bracket 25.

The control shaft 13 passes through the frame 24 and rotates relative thereto in suitable bearings 26 and 27, respectively. The frame 24 is composed of two parts as best shown in Figure 4 wherein the first portion 28 is a generally hollow cylindrical member and the second portion 29 is also generally a hollow cylindrical member and is attached to the portion 28 by a coupling plate 30. Within the confines of the portion 28 is wound a suitable magnetic coil 31 which has leads 32 and 33 that extend through suitable openings formed through the portion 28.

Mounted between the portions 28 and 29 is a stop wheel 34 which is keyed or otherwise fastened to the shaft 13 and which is formed with a plurality of openings 35 about its periphery.

A ball 36 is mounted in each of the openings 35 and a plurality of finger springs 37 are attached to the stop wheel 34 and have curved end portions 38 which engage the ball 36.

An opening 39 is formed through the portion 29 so as to be in alignment with one of the openings 35 and the balls 36 may be received within the opening 39 so as to lock the shaft 13 to the portion 29.

Also mounted on the shaft 13 between the portions 28 and 29 is a plate 40 which is rotatably supported relative to the shaft and which has an upwardly extending projection 41 that is engageable with the roller 22 of the switch actuating lever 21. The plate 40 is formed with three openings 42 through which guide pins 43 extend so as to prevent it from rotating relative to the portion 28. Thus the plate 40 is prevented from rotating relative to the portion 28 but may move longitudinally of the shaft 13. As best shown in Figures 3 and 4, an arm 44 is attached to the upper portion 41 and carries a plunger 45 that is receivable within the opening 39. The plunger 45 is engageable with the balls 36 to force them out of the opening 39 so as to allow operation of the shaft positioning mechanism.

The clutch gear 15 as shown in section in Figure 4 comprises an outer toothed portion 46 which is mounted upon an inner portion 47 and bearings 48. The portions 46 and 47 are mounted together tightly enough so that rotation will be transmitted to the shaft 13 when the shaft is relatively free to turn but slippage will occur when the shaft is held.

A spring 49 is mounted between the portion 28 and the plate 40. The plate 40 is made of magnetic material so that it is drawn toward the magnetic coil 31 when power is connected to the leads 32 and 33.

The schematic wiring is illustrated in Figure 1 wherein one lead 33 from the magnetic coil 31 is connected to the positive side of the motor 14 and to the positive terminal 50 of a suitable voltage supply.

It is assumed that the negative terminal of the suitable voltage supply is grounded. The lead 32 of the magnetic coil 31 is connected to a common contact 51 of a seeking switch designated generally as 52.

The shaft 13 is connected to the rotor 53 of the seeking switch 52. The seeking switch rotor 53 is formed with a gap 54. A plurality of contacts 55a through 1 are mounted about the rotor 53 and engage it except when the notch 54 is adjacent thereto.

A plurality of control wires 56a through 1 are connected, respectively, to the contact 55a through 1 and have their opposite ends connected to terminals 57a through 1.

A wiper contact 58 is engageable with the contacts 57a through 1 and is connected to ground by a suitable lead 59. A control shaft 60 is connected to the wiper contact 58 and may be selectively positioned by control knob 61.

It is to be realized that other control systems may be used, as for example, one similar to the wire saving scheme shown in Patent No. 2,476,673, "Shaft Positioning Control System."

In operation the control knob 61 is positioned to the desired place and this moves the wiper contact 58 into engagement with a particular one of the contacts 57a through 1. If the wiper contact 58 is in contact with a terminal which does not correspond to the contact 55a through 1, which has the open circuit notch 54 aligned therewith, the lead 32 will be connected tto ground which will cause current to flow through the coil 31.

When current flows through coil 31 it causes the plate 40 to move to the left relative to Figure 4, thus forcing the ball 36 within the opening 39 out with the plunger 45. The portion 41 moves the switch actuating lever 21 to the left thus closing the switch 18.

When the switch 18 is closed the motor 14 starts and drives the control shaft 13 and the rotor 53. The stop wheel 34 is simultaneously driven.

The motor continues to run until the notch 54 reaches a position corresponding to that of the wiper contact 58 at which time an open circuit occurs in the control circuit thus de-energizing the coil 31 which immediately allows the plate 40 to move to the right due to the action of the spring 49 and the first ball 36 which passes the opening 39 seats therein and locks the stop wheel. The ball 36 seats sufficiently into the opening 39 so that the shaft 13 is locked.

It is to be noted that the piston 45 moves to the right to allow the ball to fall into opening 39 upon de-energizing of the magnet 31.

Simultaneously, when the plate 40 moves to the right the switch 18 is disconnected thus interrupting the voltage supply to the motor 14 which disconnects it. Any inertia of the system caused by the motor continuing to rotate after being disconnected is dissipated in the slip clutch 15.

It is therefore seen that the present invention provides a shaft control mechanism wherein a control shaft may be positioned to any one of a plurality of positions.

Although the invention has been described with respect to particular embodiments thereof, it is not to be so limited as changes and modifications may be made therein which are within the full intended scope of the invention as defined by the appended claims.

I claim:

1. A shaft control device comprising, a controlled shaft, a driving means connected to said controlled shaft, a frame member rotatably supporting said controlled shaft, a magnetic coil mounted in said frame member, a plate attached to one portion of the frame member and supported for longitudinal motion relative to said controlled shaft, an arm attached to said plate, a plunger connected to said arm, a stop-wheel attached to said controlled shaft and formed with a plurality of openings about its periphery, a plurality of balls received in said openings, a plurality of springs attached to said stop-wheel and engageable with said balls, a second portion of said frame member engageable with said balls and formed with an opening in alignment with said balls and through which said plunger extends, a motor control switch connected to said frame member and engageable with said plate, the motor control switch connected to said driving means, a seeking switch mounted on said controlled shaft and electrically connected to said coil, a voltage supply connected to said driving means and the other side of said coil, and a selector switch electrically connected to said seeking switch.

2. A shaft control mechanism for positioning a controlled element comprising, a controlled shaft attached to said controlled element, a driving means connected to said controlled shaft, a frame member supporting said controlled shaft, a motor control switch mounted on said frame member and connected to said driving means, a magnetic coil mounted to said frame member concentric with said controlled shaft, a plate nonrotatably supported by said frame member and free to move longitudinally of said controlled shaft, said plate engageable with said motor control switch, a stop-wheel mounted on said controlled shaft and formed with a plurality of openings adjacent its periphery, a plurality of springs extending outwardly from said stop-wheel, a plurality of balls mounted in the openings formed in said stop-wheel and engageable with said springs, a second portion of said frame member in engagement with said balls, an opening formed in said second portion of said frame member to allow one of said balls to seat therein, a plunger receivable in said opening and connected by an arm to said plate, a voltage supply connected to said driving means and to one side of said magnetic coil, and a seeking switch connected to said controlled shaft and connected electrically to one side of said magnetic coil.

3. A shaft controlling mechanism comprising, a frame member rotatably supporting a controlled shaft, said frame member formed of two hollow generally cylindrical portions attached together with a coupling plate, a magnetic coil mounted within one of said portions concentric with said controlled shaft, a magnetic plate mounted to one of said portions concentric with said controlled shaft, a plurality of guide pins attached to said first portion of said frame member, openings formed in said plate and receivable over said guide pins to prevent rotary motion but to allow longitudinal motion, a stop-wheel mounted on said controlled shaft between the first and second portions of said frame and formed with a plurality of openings about its periphery, a plurality of balls received in said openings, a plurality of springs engageable with said balls, a second portion of said frame member engageable with said balls to hold them centered in the stop-wheel, an opening formed through said second portion of said frame member in alignment with said balls, a plunger receivable in said opening, an arm connecting said plunger to said plate, and a motor control switch mounted on said frame member and engageable with said plate and actuated thereby.

4. A shaft controlling means comprising, a frame member formed of two generally hollow cylindrical portions connected together by a coupling plate, a controlled shaft rotatably supported by said frame member, a magnetic coil mounted in one portion of said frame member concentric with said controlled shaft, a plate of magnetic material supported by said frame member and movable longitudinally of said controlled shaft, a spring member mounted between said first portion of said frame member and said plate to bias it away from said first portion, a stop-wheel mounted on said controlled shaft between the first and second frame portions and formed with a plurality of openings about its periphery, a plurality of finger springs mounted to said stop-wheel and extending over each opening formed in said stop-wheel, a plurality of balls receivable in said openings of said stop-wheel, said balls engageable with said second portion of said frame member, an opening formed through said second portion of said frame member in alignment with said balls, a plunger received within said opening, an arm connecting said plunger with said magnetic plate, a driving means connected to said controlled shaft, a driving-means switch mounted on said frame member and engageable with said magnetic plate, said driving-means switch electrically connected to said driving means, a voltage supply connected to said driving means and to one side of said magnetic coil, a seeking switch mounted on said controlled shaft and electrically connected to the other side of said magnetic coil, a selector switch, and said selector switch electrically connected to said seeking switch.

5. A shaft control means comprising, a frame member, a controlled shaft rotatably supported by said frame member, a magnetic coil supported by said frame member concentric with said shaft, a magnetic plate supported by said frame member for longitudinal motion relative thereto, a spring means between said frame member and said magnetic plate to bias them apart, a stop-wheel mounted on said controlled shaft and formed with a plurality of openings, a plurality of finger springs mounted on said stop-wheel and extending over the openings formed in said stop-wheel, a plurality of balls mounted in said stop-wheel, a second portion of said frame member engageable with said balls, an opening formed through said second portion of said frame member in alignment with said balls, a plunger received in the opening through said second frame portion, an arm extending from said plunger to said magnetic plate, a motor control switch mounted on said frame member and engageable with said magnetic plate, driving means connected to said controlled shaft, said motor control switch connected electrically to said driving means, a supply voltage connected to said driving means and said magnetic coil, a seeking switch having a stator and rotor with its rotor connected to said controlled shaft and electrically connected to said magnetic coil, a selector switch connected electrically to the stator of said seeking switch and the rotor of the selector switch connected to a selector shaft.

6. A shaft control means comprising, a frame member, a controlled shaft rotatably supported by said frame member, a magnetic coil supported by said frame member concentric with said shaft, a magnetic plate supported by said frame member for longitudinal motion relative thereto, a spring means between said frame member and said magnetic plate to bias them apart, a stop-wheel mounted on said controlled shaft and formed with a plurality of openings, a plurality of finger springs mounted on said stop-wheel and extending over the openings formed in said stop-wheel, a plurality of balls mounted in said stop-wheel, a second portion of said frame member engageable with said balls, an opening formed through said second portion of said frame member in alignment with said balls, a plunger received in the opening through said second frame portion, an arm extending from said plunger to said magnetic plate, a motor control switch mounted on said frame member and engageable with said magnetic plate, driving means connected to said controlled shaft, a clutch element between the driving means and controlled shaft, said motor control switch connected electrically to said driving means, a supply voltage connected to said driving means and said magnetic coil, a seeking switch having a stator and rotor with its rotor connected to said controlled shaft and electrically connected to said magnetic coil, a selector switch connected electrically to the stator of said seeking switch and the rotor of the selector switch connected to a selector shaft.

References Cited in the file of this patent

UNITED STATES PATENTS

| | | |
|---|---|---|
| 2,515,944 | Bennett | July 18, 1950 |
| 2,529,227 | Rosenblum | Nov. 7, 1950 |
| 2,617,313 | Schweighofer et al. | Nov. 11, 1952 |